(12) United States Patent
Kawano

(10) Patent No.: US 11,774,970 B2
(45) Date of Patent: Oct. 3, 2023

(54) CONTROL APPARATUS, METHOD AND PROGRAM

(71) Applicant: NIPPON TELEGRAPH AND TELEPHONE CORPORATION, Tokyo (JP)

(72) Inventor: Hiroshi Kawano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 107 days.

(21) Appl. No.: 16/969,514

(22) PCT Filed: Feb. 13, 2019

(86) PCT No.: PCT/JP2019/004984
§ 371 (c)(1),
(2) Date: Aug. 12, 2020

(87) PCT Pub. No.: WO2019/159927
PCT Pub. Date: Aug. 22, 2019

(65) Prior Publication Data
US 2020/0401140 A1  Dec. 24, 2020

(30) Foreign Application Priority Data
Feb. 14, 2018 (JP) .................. 2018-024182

(51) Int. Cl.
*G05D 1/02* (2020.01)
*G05D 1/00* (2006.01)

(52) U.S. Cl.
CPC ............. *G05D 1/02* (2013.01); *G05D 1/0094* (2013.01)

(58) Field of Classification Search
CPC ....... G05D 1/02; G05D 1/0094; G05D 1/0027
See application file for complete search history.

(56) References Cited

U.S. PATENT DOCUMENTS 6,636,781 B1 * 10/2003 Shen .................. B25J 9/065
703/2
10,254,766 B2 * 4/2019 High .................. G05D 1/0295
(Continued)

FOREIGN PATENT DOCUMENTS

JP        20169354      1/2016
JP        2016-119040   6/2016

OTHER PUBLICATIONS

Vassilvitskii, Serguei, et al., "A Complete, Local and Parallel Reconfiguration Algorithm for Cube Style Modular Robots," Proceedings of the 2002 IEEE International Conference on Robotics of Automation, Washington, DC, May 2002.
(Continued)

*Primary Examiner* — Khoi H Tran
*Assistant Examiner* — Aaron G Cain

(57) ABSTRACT

The present disclosure relates to systems and methods for controlling an array of multiple autonomous robots. In particular, the methods addresses an issue of controlling the multiple autonomous robots with to-be-controlled object units (units) when there is a non-contact portion in a common location between a set of initial locations of the units and a set of target locations of the units. The methods include: selecting a head to-be-controlled object unit (head object) based on a object unit at a location inside a set of locations and adjacent to a destination location, selecting a tail to-be-controlled object unit (tail object) based on a unit at a location outside the set and inside the initial location, moving a series of units from the head unit to the tail unit so as to follow operation of the head unit, and updating the set based on the destination location.

20 Claims, 17 Drawing Sheets

(56) References Cited

U.S. PATENT DOCUMENTS

| | | | |
|---|---|---|---|
| 10,857,670 B2* | 12/2020 | Rus | B25J 9/08 |
| 2017/0157768 A1* | 6/2017 | Buthala | B25J 9/08 |
| 2017/0212511 A1* | 7/2017 | Paiva Ferreira | G08G 1/22 |
| 2018/0211546 A1* | 7/2018 | Smartt | G08G 1/161 |
| 2019/0035283 A1* | 1/2019 | Dudar | G08G 1/22 |
| 2019/0049944 A1* | 2/2019 | Pohl | H05B 47/155 |

OTHER PUBLICATIONS

Kawano, Hiroshi, "Complete Reconfiguration Algorithm for Sliding Cube-Shaped Modular Robots with only Sliding Motion Primitive," 2015 IEEE/RSJ International Conference on Intelligent Robots and Systems (IROS) Congress Center Hamburg, Sep. 28-Oct. 2, 2015, Hamburg, Germany.

* cited by examiner

CONTROL APPARATUS, METHOD AND PROGRAM

CROSS-REFERENCE TO RELATED APPLICATIONS

This application is a U.S. 371 Application of International Patent Application No. PCT/JP2019/004984, filed on 13 Feb. 2019, which application claims priority to and the benefit of JP Application No. 2018-024182, filed on 14 Feb. 2018, the disclosures of which are hereby incorporated herein by reference in their entireties.

TECHNICAL FIELD

The present invention relates to a technique for controlling actions of a plurality of control objects. For example, the prevent invention relates to a robot cooperative control technique for obtaining an action plan of each robot in order to cause a plurality of robots to move from an array-formed state at an initial position in a cooperative manner, avoid an obstacle, and form an array at a target position.

BACKGROUND ART

In recent years, research to efficiently control a large number of autonomous mobile robots is actively conducted. While mission contents of the robots widely vary from monitoring locations inaccessible to people to transporting goods, there is a demand for a technique that enables a large number of robots to efficiently form an array through cooperative actions and active research is underway.

In particular, among array control of robots, robot array control under the assumption that robots move as a whole in an amoeboid manner in a state where the robots are in contact with each other has an advantage that an absolute position of each robot can be determined from a relative positional relationship between robots and an advantage that additional equipment for position measurement is not required, and research of such robots is also underway. For example, a series of research leading to a research shown in NPL 2 presents array control that involves a change from a certain array into another array (for example, refer to NPL 2).

In order to realize efficient array formation involving a large number of robots as described above, it is important that an arrangement, an operation order, and the like of each robot are planned in advance. It is needless to say that, in such a plan, the presence of an obstacle, a shape of a route, and the like in a real environment where a plurality of robots are to operate must also be given due consideration.

A method presented in the research shown in NPL 1 deals with an array transformation of a plurality of cube-shaped robots due to extension/contraction plane operations (operations in which a certain robot moves while extending and contracting in a state where the robot is in contact with another robot) among the robots.

A method presented in the research shown in NPL 2 deals with an array transformation of a plurality of cube-shaped robots due to plane shear motions (operations in which, in a state where a certain robot is in contact with another robot, the certain robot slides on a contact plane) and wraparound motions among the robots.

CITATION LIST

Non Patent Literature

NPL 1 Vassilvitskii, M. Yim, J. Suh, "A Complete, Local and Parallel Reconfiguration Algorithm for Cube Style Modular Robots", in Proc. 2002 IEEE Int. Conf. Robotics and Automation, pp. 117-122, Washington D.C., May, 2002.

NPL 2 Kawano, H., "Complete Reconfiguration Algorithm for Sliding Cube-shaped Modular Robots with only Sliding Motion Primitive", 2015 IEEE/RSJ International Conference on Intelligent Robots and Systems, pp. 3276-3283, September 2015, Hamburg, Germany.

SUMMARY OF THE INVENTION

Technical Problem

In NPL 2, motions in a state where each robot is in contact are assumed and each robot has same characteristics (homogeneous). In other words, array control in a case where a shape of a set of target positions of the respective robots is determined is realized. However, application of the array control is limited to conditions where there is no disconnect location in a common portion of a set of array positions assumed by robots in an initial state and a set of target positions of the robots.

In consideration thereof, an object of the present invention is to provide a control apparatus, a control method, and a program which realize array control that is applicable even when there is a disconnect location in a common portion of an initial position of control object units and a target position of the control object units.

Means for Solving the Problem

A control apparatus according to an aspect of the present invention is a control apparatus which moves a plurality of control object units at initial positions to target positions, and assuming that formation of one block of control object structure by control object units due to each control object unit being adjacent to another control object unit is referred to as connectivity of a control object structure, a common portion of the initial positions and the target positions is common positions, and a set of the common positions is constituted by at least one common position subset that is not mutually adjacent, the control apparatus includes: a set selecting unit which selects a certain common position subset as a set Up; a control object unit selecting unit which selects a control object unit which is at a position belonging to the set Up and which is adjacent to a position where a control object unit in the target positions is not present (hereinafter, referred to as an object position D) as a head control object unit and which selects a control object unit which is at a position not belonging to the set Up and being in the initial positions and which is capable of maintaining connectivity of the control object structure even when moved as a tail control object unit; a control object unit moving unit which moves, with the object position D as an object position, a string of control object units from the head control object unit to the tail control object unit so as to follow a motion of the heat control object unit; a set adding unit which, after adding the object position D to the set Up, when there is a control object unit which is in contact with the set Up and which is positioned in the target positions and not in the set Up, adds a position of the control object unit and a position of a control object unit in a connected state from the control object unit only via the target positions to the set Up; and a control unit which causes processes of the control object unit selecting unit, the control object unit moving unit, and the set adding unit to be repetitively performed until there are no more positions where a control object is not present in the target positions.

Effects of the Invention

According to the present invention, array control that is applicable even when there is a disconnect location in a common portion of an initial position of control object units and a target position of the control object units can be realized.

DESCRIPTION OF EMBODIMENTS

Figure 1:
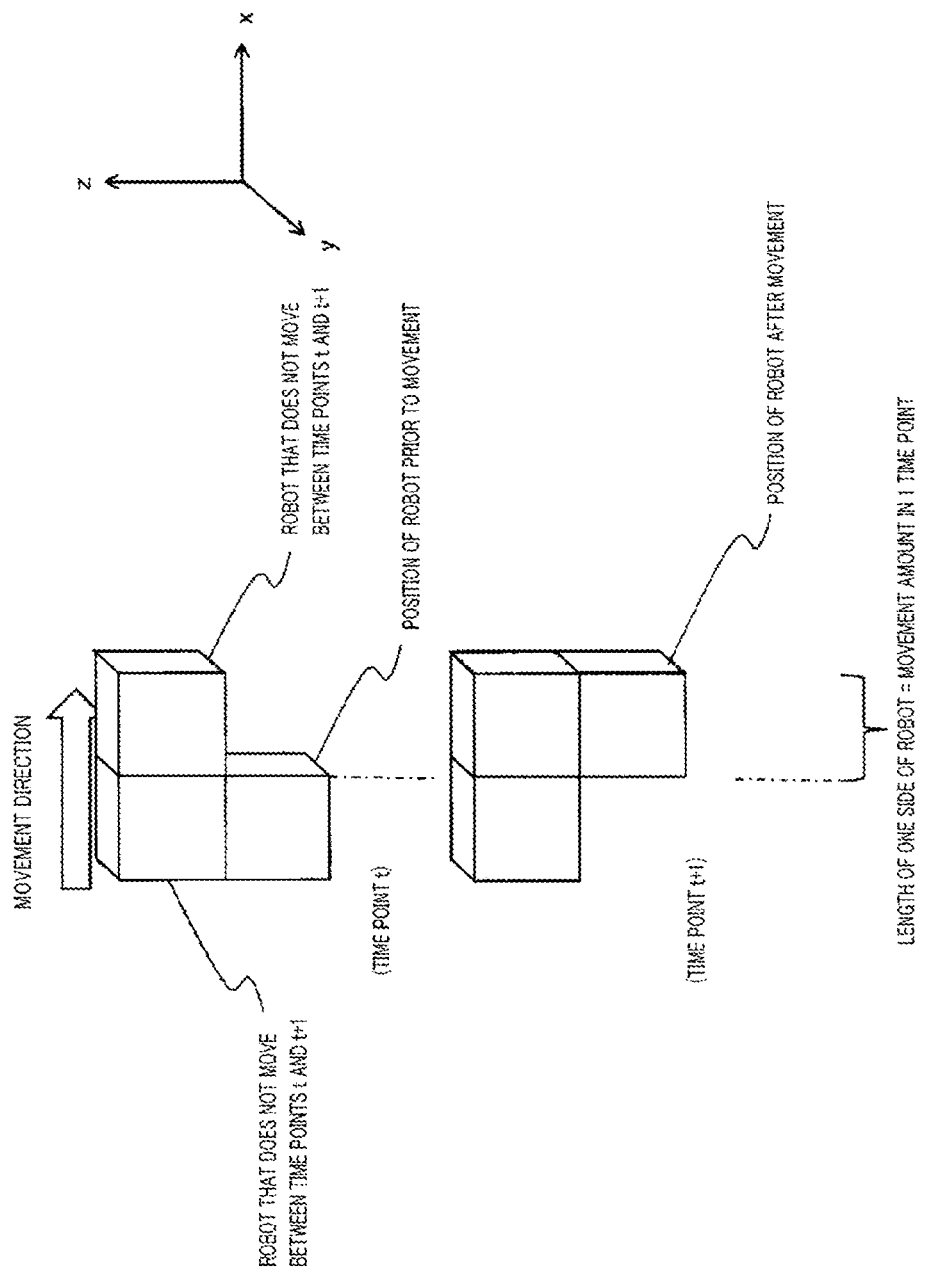
FIG. 1 is a diagram illustrating a movement of a robot.

Hereinafter, an embodiment of the present invention will be described. It should be noted that, in the drawings used in the following description, same components that have same functions and same steps that perform same processes will be denoted by same reference characters and redundant descriptions thereof will be omitted.

<Theoretical Background>

First, a theoretical background of a control apparatus and a control method will be described. Hereinafter, while a case where a control object that is an object of action control is a robot will be described as an example, the control object may be an article other than a robot as long as the article may be used as an object of control.

[Problem Establishment]

Figure 2:
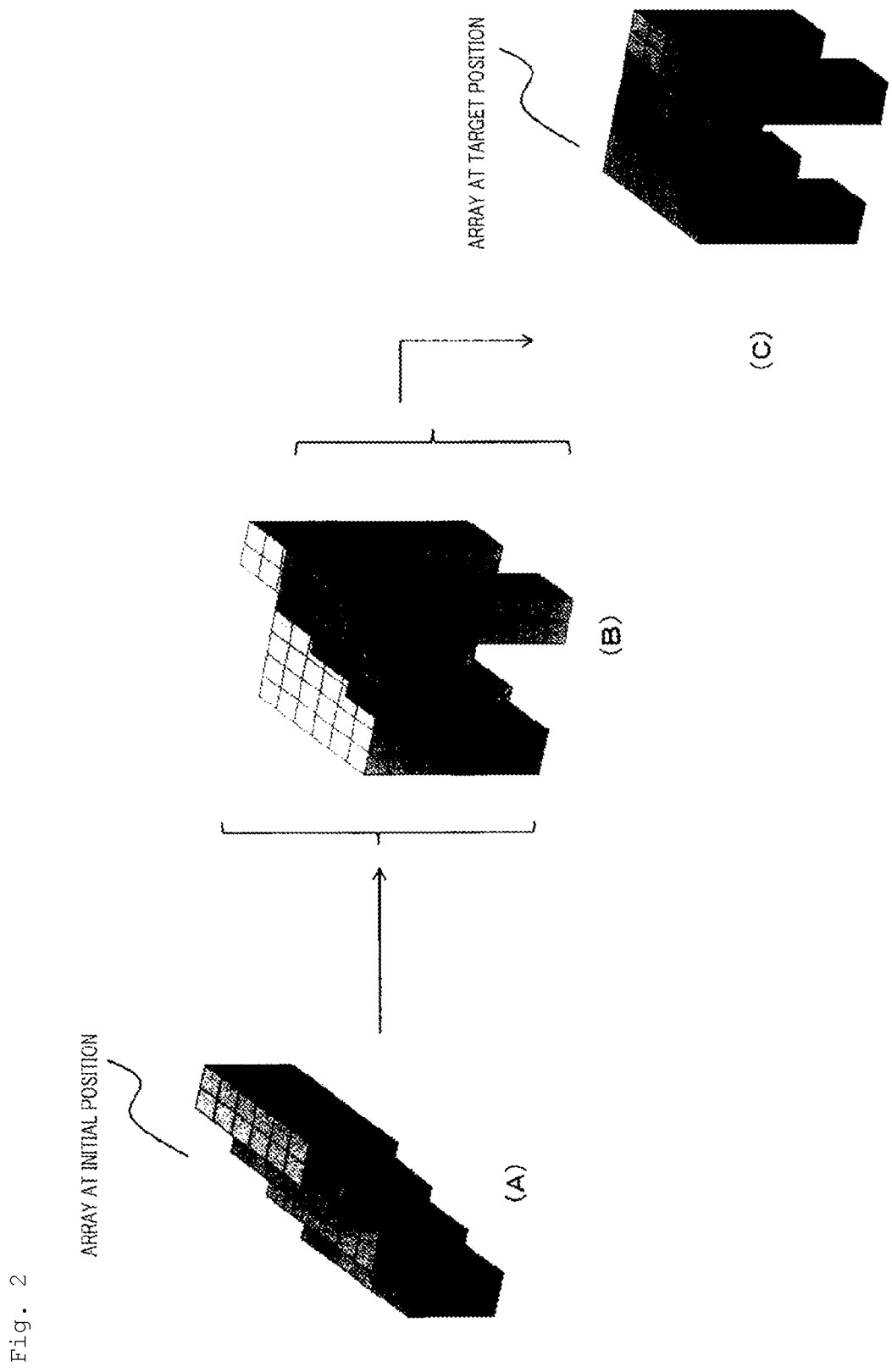
FIG. 2 is a diagram illustrating initial positions and target positions of control object units.
Figure 3:
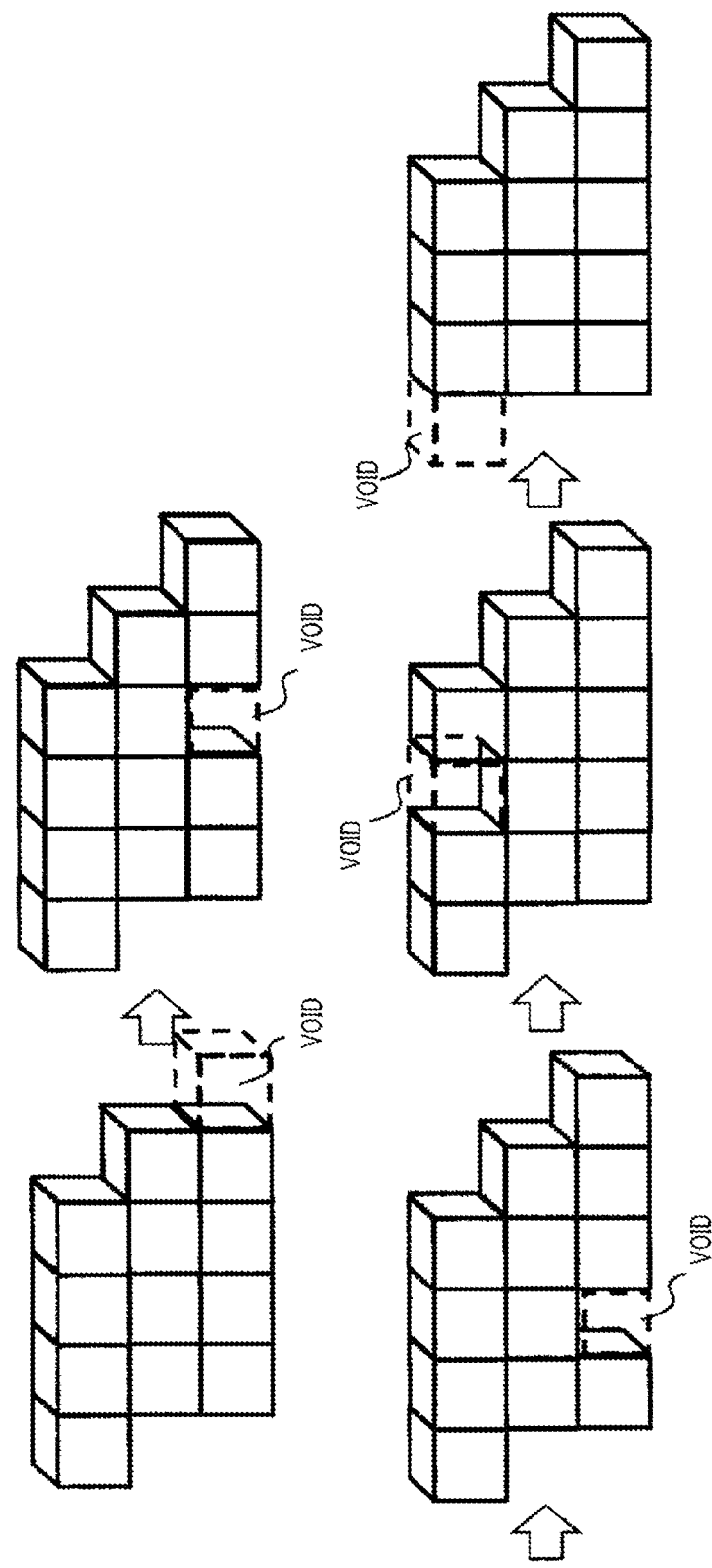
FIG. 3 is a diagram illustrating how a void moves.

For a mission by a large number of control objects involving moving in a cooperative manner from an array-formed state at an initial position while maintaining a state where the respective control objects are in contact with each other and forming an array at a target position, for example, the use of cube-type control objects capable of moving while causing contact surfaces to slide against each other is assumed as exemplified in FIG. 1. As shown in FIG. 2, the mission is realized by a movement of a plurality of control objects from an initial position to a target position in a room partitioned by walls (however, the walls are omitted in the drawing).

For example, as shown in FIG. 1, it is assumed that a control object moves while maintaining a state where another control object is present in one of six cells in vertical, lateral and height directions (hereinafter, up-down, left-right, and front-rear directions) in a periphery of the control object. This method has an advantage in that, by having one control object itself move by a distance corresponding to a size of one control object, a movement amount by one motion can be accurately measured. In addition, by mutually measuring relative positions with an adjacent control object that shares one surface, a position of each control object among an entire group of control objects can be readily assessed. Therefore, problems such as a misalignment of an array due to an error of a movement amount of a control object are less likely to occur. Furthermore, by coupling a plurality of control objects to each other, a plurality of control objects can be moved simultaneously. It is assumed that a control object is capable of knowing whether or not another control object is present at an adjacent position, whether or not there is an obstacle, and whether or not the control object itself is at a target position.

It is assumed that the number of control objects to perform the mission is p (for example $p \geq 16 = 8 \times 2$), and each control object is movable in directions of X, Y, and Z axes in a three-dimensional space while sharing one or more surfaces with adjacent control objects. Each cube in FIG. 1 indicates a position of each control object. Only one control object can be present in each cube. It is assumed that each control object is to stand still when an obstacle or another control object is present in a direction in which the control object intends to move. A cube-shaped space in which a control object may be present is also referred to a cell or a grid. In FIG. 2, a cell colored dark gray indicates a position where a control object is present. Positions where control objects are present in FIG. 2(A) indicate a set of initial positions of the control objects, and positions where control objects are present in FIG. 2(C) indicate a set of target positions of the control objects. As shown in FIG. 2(B), the set of target positions and the set of initial positions are in contact with each other. An area represented by the set of target positions is also referred to as a target array area. As described above, each initial position and each target position are adjacent to another initial position and another target position in at least any of vertical, lateral and height directions, and array shapes of the control objects at the initial positions and the target positions are respectively one block of an arbitrary shape.

[Coordinate Settings of Control Object]

When a position of each control object i (where i=0, 1, 2, 3, . . . , p−1 representing a control object number) is denoted by $(Xr[i], Yr[i], Zr[i])$, an initial position is denoted by $(Xr0[i], Yr0[i], Zr0[i])$, and a target position is denoted by $(Xre[i], Yre[i], Zre[i])$, the present problem can be defined as obtaining an action plan for an control object arranged at an initial position to move to a target position. A set of initial positions of the control objects will be denoted by s and a set of target positions $(Xre[i], Yre[i], Zre[i])$ will be denoted by g.

[Definition of Mission Space]

When i denotes a control object number, each state of the control object i (a position and an action of the control object) is expressed by a discrete value. When a room is represented by a three-dimensional space constituted by an X, Y, Z orthogonal coordinate system, each position is expressed by values respectively discretely expressing the X axis, the Y axis, and the Z axis. In other words, the room (the three-dimensional space) is divided into grids and each grid corresponds to each position. In addition, a "presence/absence" of an obstacle is set in advance in each grid.

[Definition of Control Object Operation]

An entity of action is each control object arranged in the room. An action a of the control object i (where i denotes a control object number) adopts any of a total of seven types of actions including standing still and moving by one grid in vertical, lateral and height directions. For example, when a∈{0, 1, 2, 3, 4, 5, 6}, it is assumed that 0: standing still 1: moving by one grid in a positive X-axis direction within a three-dimensional space 2: moving by one grid in a positive Y-axis direction within a three-dimensional space 3: moving by one grid in a negative X-axis direction within a three-dimensional space 4: moving by one grid in a negative Y-axis direction within a three-dimensional space 5: moving by one grid in a positive Z-axis direction within a three-dimensional space 6: moving by one grid in a negative Z-axis direction within a three-dimensional space.

[Problems in Route Search Calculation]

A state space in such a mission environment has states of the number of dimensions which is calculated as the number of control objects×3, and the number of selectable actions is calculated as the number of control objects power of the number of actions of control objects (=7). For example, when the number of control objects is 50 and the number of grids in each of the vertical, lateral and height directions of the room is 20, the number of states is 150-th power of 20, which means that an amount of resource necessary for route search calculation is enormous. In addition, every time the number of control objects increases by 1, the number of states increases 8,000-fold. As described in the section titled [Problem establishment] in the present embodiment, when adopting a constraint that requires control objects to be in contact with each other, the fact that a route search calculation must be performed in consideration of mutual movements of the control objects makes it difficult to radically reduce the amount of calculations and poses a significant problem when using a plurality of control objects.

[Characteristics of Reference 1]

In heterogeneous array control according to Reference 1, a concept of void control is introduced as a measure to solve the problem of calculation load described above. In addition, a concept of an 8-cell control object unit is also introduced in order to overcome the problem of array transformation as described in [Problem establishment].

First, void control will be described. In this case, a void refers to a gap which is created at an original position of a certain control object after the control object moves to another position. In other words, a void is a virtual existence which moves in an opposite direction to a direction in which a control object moves. With such an array formation problem of a group of control objects, although route search calculations reach an enormous amount when focusing on motions of a plurality of control objects, shifting perspectives and focusing on a movement of a void enables a problem of a motion plan of a large number of control objects to be considered a motion plan of a single void and is suitable for reducing a route search calculation load. However, respective control objects belonging to a same control object unit scatter during a transformation operation and end up being separated into different control object units, resulting in an increase in a load of a subsequent control object reshuffling operation. In addition, in a case where initial positions and target positions have a common portion and the common portion is divided into a plurality of disconnect portions, void control is not applicable.

[Reference 1] Kawano, H., "Tunneling-Based Self-Reconfiguration of Heterogeneous Sliding Cube-Shaped Modular Robots in Environments with Obstacles", 2017 IEEE International Conference on Robotics and Automation, pp. 825-832, May 2017, Singapore.

[Introduction of 4-Cell Control Object Unit]

In consideration thereof, in an embodiment to be described below, for example, it is assumed that four adjacent control objects constitute one unit (a control object unit) and that the control objects move while maintaining the control object unit as shown in FIG. 4(A). In other words, one control object unit is constructed by every four control objects, and the four control objects that constitute one control object unit move while maintaining a state where each control object is adjacent in three directions to the other control objects that constitute the one control object unit. In a group of such control object units, each control object unit shares a surface with another control object unit and the control object units are controlled so as to move while maintaining contact with each other. The four control objects belonging to the same control object unit are assumed to be the same and homogeneous, and a position of each control object within the same control object unit will not be taken into consideration.

Such a movement by one unit constituted by four control objects is performed because control objects belonging to another control object unit can pass through four gap spaces inside each control object unit and, accordingly, control objects belonging to different control object units can be readily interchanged. In addition, connectivity when control objects belonging to another control object unit pass through the four gap spaces inside each control object unit can be readily maintained. In other words, consequently, a calculation load for considering a connection between control objects can be reduced when determining a motion of each control object which requires that maintaining array configuration be taken into consideration.

In this case, it is assumed that a control object unit formed by four control objects constitutes a unit of a cell (in the present embodiment, this unit will also be referred to as a "cell unit" or a "position unit"), and a state space is modeled with one cell unit as one state. If a position of a control object unit is expressed as $(Xr\_u[j], Yr\_u[j], Zr\_u[j])$ (j=0, 1, 2, ..., j_max−1), i1, i2, i3, and i4 denoting control objects in the control object unit j satisfy the following:

$$Xr[i1]=2 \times Xr\_u[j]$$

$$Yr[i1]=2 \times Yr\_u[j]+1$$

$$Zr[i1]=2 \times Zr\_u[j]$$

$$Xr[i2]=2 \times Xr\_u[j]+1$$

$$Yr[i2]=2 \times Yr\_u[j]$$

$$Zr[i2]=2 \times Zr\_u[j]$$

$$Xr[i3]=2 \times Xr\_u[j]$$

$$Yr[i3]=2 \times Yr\_u[j]$$

$$Zr[i3]=2\times Zr\_u[j]$$

$$Xr[i4]=2\times Xr\_u[j]$$

$$Yr[i4]=2\times Yr\_u[j]$$

$$Zr[i4]=2\times Zr\_u[j]+1$$

It should be noted that a variable representing the control object unit j to which each control object i belongs is denoted by $Rr[i]=j$ and is constant at any time point during array control. In addition, a variable representing which of the positions i1, i2, i3, and i4 described above a control object is present at is denoted by $Ir[i]=(1, 2, 3, 4)$. An initial position of each control object unit is expressed as $(Xr\_u0[j], Yr\_u0[j], Zr\_u0[j])$ and a target position of each control object unit is expressed as $(Xr\_ue[j], Yr\_ue[j], Zr\_ue[j])$. Hereinafter, an overall number p of control objects is assumed to be a multiple of 4.

It should be noted that an 8-cell control object unit can also be constructed by combining two control object units as shown in FIG. 4(B), and array control of a control object group that is constituted by 8-cell control object units is also realized by performing control in 4-cell control object units.

Figure 4:
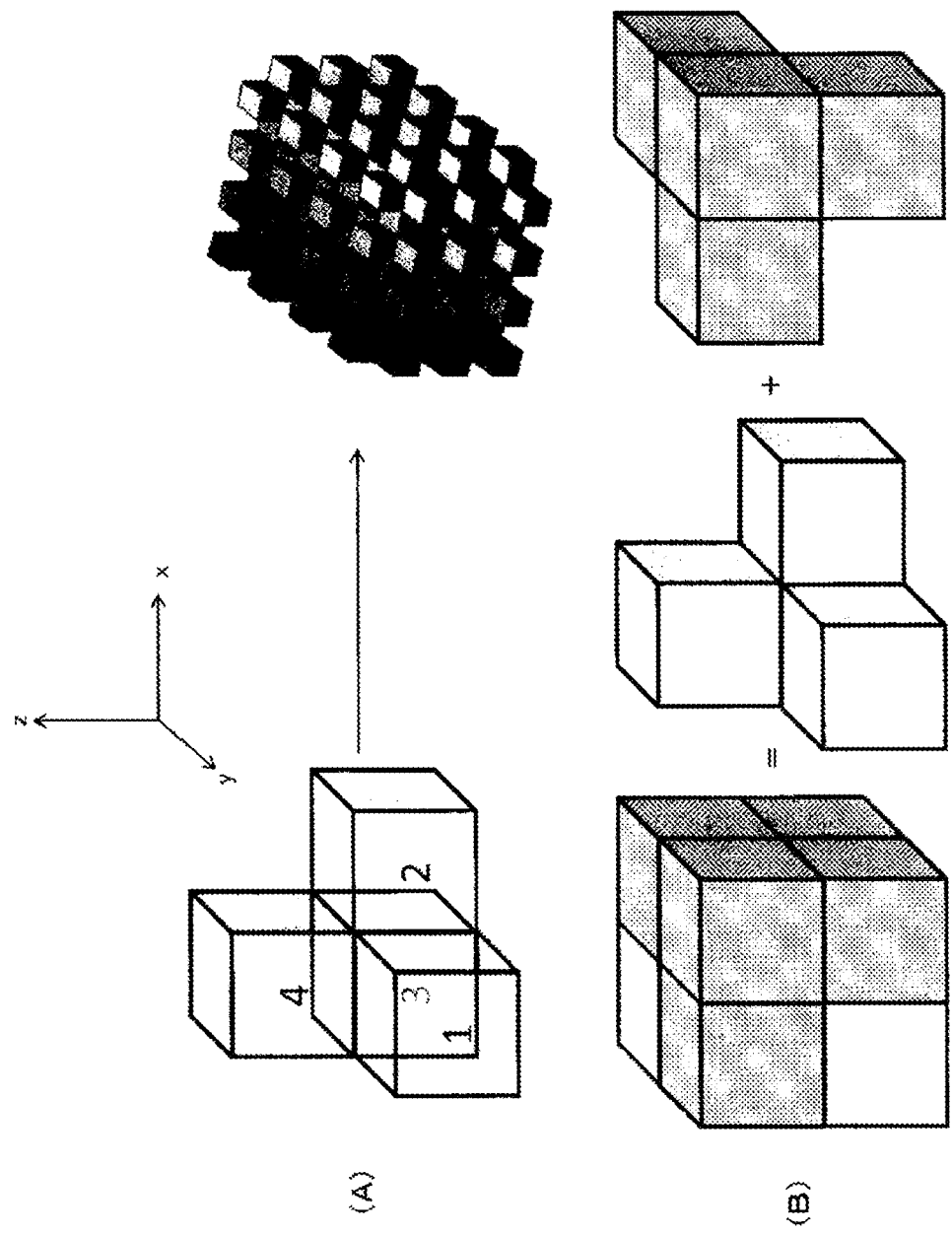
FIG. 4 is a diagram illustrating examples of control object units.

In addition, control object units are not limited to the example shown in FIG. 4 and need only be constructed so as to satisfy the following conditions. Specifically, a control object unit is: (1) a partial structure inside a cube-shaped space (hereinafter, this space will be referred to as a meta-module) having a length M (M≥2, where one control object is assumed to have a length of 1) in each axial direction in a three-dimensional orthogonal coordinate system (in other words, a control object unit occupies a part of a meta-module); (2) the number of control objects included in the control object unit inside the meta-module and the number of portions (in other words, gaps) other than the control object unit inside the meta-module are equal to one another; and (3) includes a structure of M-number of adjacent control objects in each axial direction. For example, the control object unit exemplified in FIG. 4 is: (1) a partial structure of a meta-module constituted by a cube including a total of 8 cells with a length of M=2 in each axial direction; (2) the number of control objects in the control object unit is 4 and is equal to the number of gaps in the meta-module, which is also 4; and (3) includes a structure in which the control objects are adjacent to each other in each axial direction.

In the following description, as an example of a control object unit, while a case where a structure formed by four control objects shown in FIG. 4 is used as a control object unit will be described, for example, a similar effect can be produced by a control object unit configured so as to satisfy the conditions (1) to (3) described above in a meta-module with a size corresponding to $M^3$-number of control objects.

[Homogeneous Array Control]

Hereinafter, a method of homogeneous control object array control will be described in which each control object unit j is moved from a state of being present at an arbitrary position in a set S of initial positions to be arranged at any position $(Xr\_ue[j], Yr\_ue[j], Zr\_ue[j])$ in a set G of target positions. It should be noted that, hereinafter, the set S of initial positions may be simply referred to as an initial position S and the set G of target positions may be simply referred to as a target position G.

In this case, it is assumed that the set S of initial positions and the set G of target positions are constituted by an 8-cell control object unit that is created by combining two 4-cell control object units. The number j_max of 4-cell control object units is an even number, and the numbers j1 and j2 of the two 4-cell control object units constituting one 8-cell control object unit have a relationship expressed as j1+j_max/2=j2 (in a case where j_max=8, 0, 1, 2, 3 are j1 and 4, 5, 6, 7 are j2, and pairs denoted as (j1, j2)=(0, 4), (1, 5), (2, 6), and (3, 7) constitute 8-cell units). j2 denotes the 4-cell control object unit represented by dots in FIG. 4(B).

Figure 5:
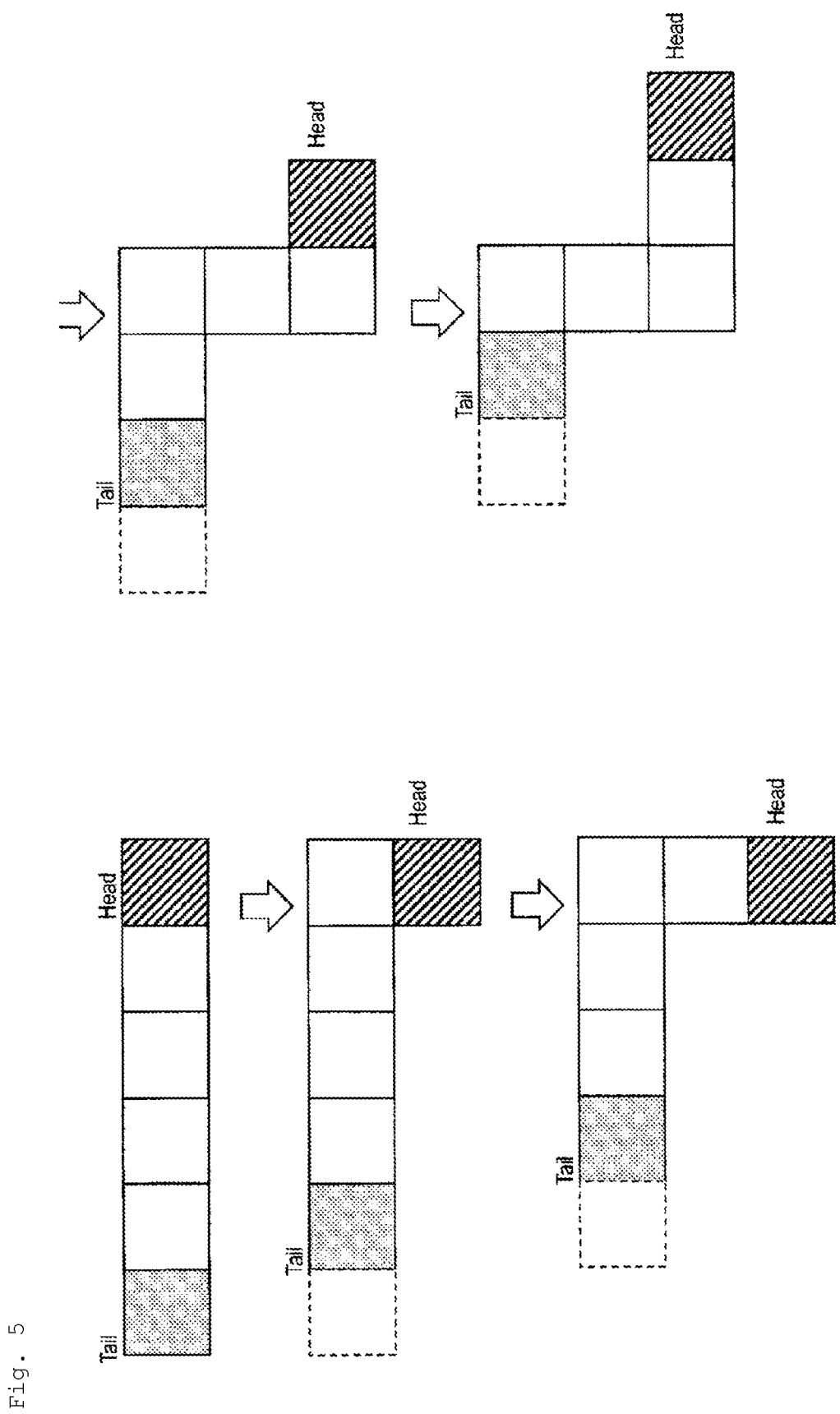
FIG. 5 is a diagram illustrating tunneling.

As shown in FIG. 5, a method referred to as tunneling is adopted in order to transform a control object structure in the state of the set S of initial positions into the state of the set G of the target positions. In an operation shown in FIG. 5, a string of control object units connecting a head control object unit Head and a tail control object unit Tail operate in a system which the string of control object units follows a motion of the head control object unit Head just like a snake. It should be noted that other control objects that perform tunneling such as a robot structure using 2×2×2 robot units of extending/contracting robots as described in NPL 1 adopts a similar tunneling operation, and a selection method of the head control object unit Head and the tail control object unit Tail of tunneling described in the present invention is similarly applicable thereto. With array transformation using tunneling, an array transformation operation can be executed without using positions other than a set of initial positions and a set of target positions even in an environment where an obstacle is present.

Figure 6:
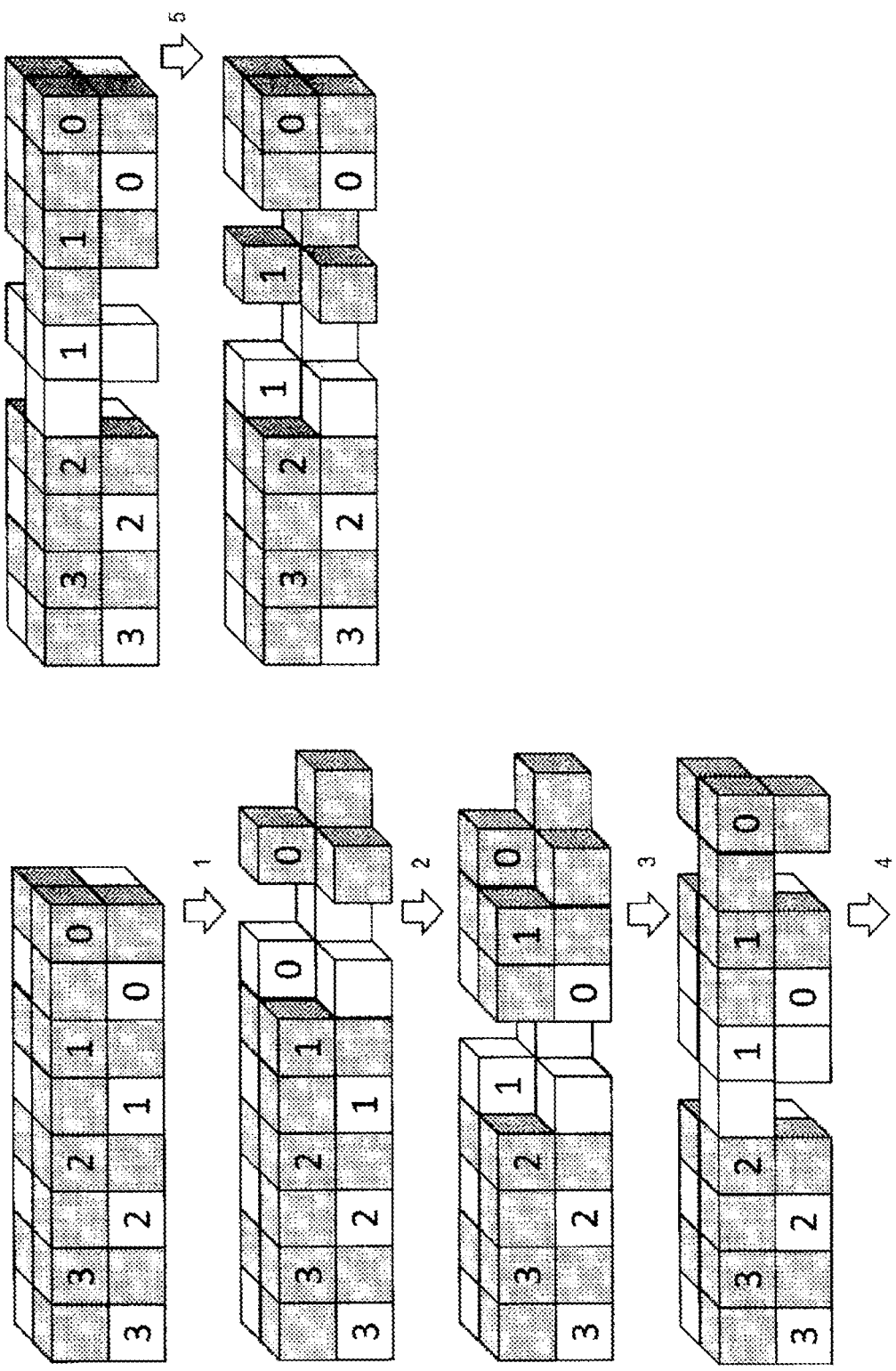
FIG. 6 is a diagram illustrating tunneling.
Figure 10:
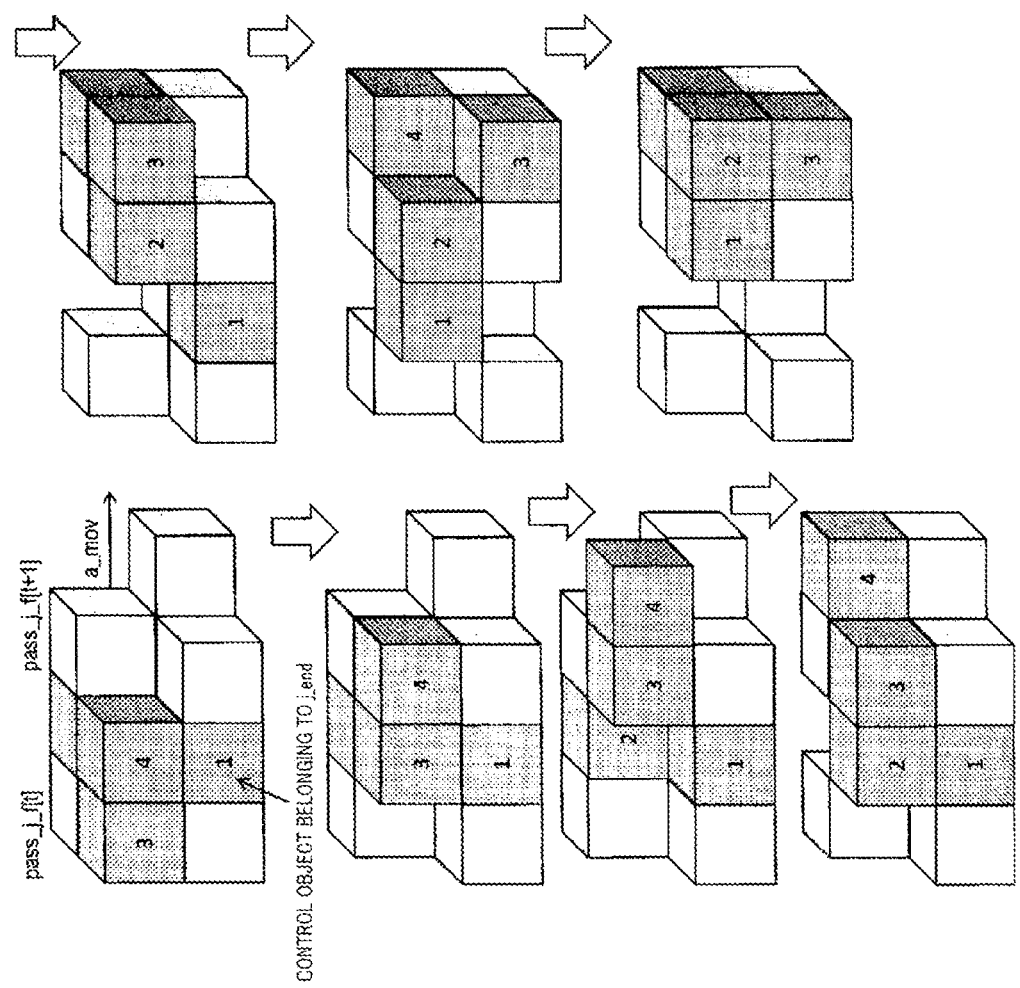
FIG. 10 is a diagram illustrating movements of control object units.
Figure 11:
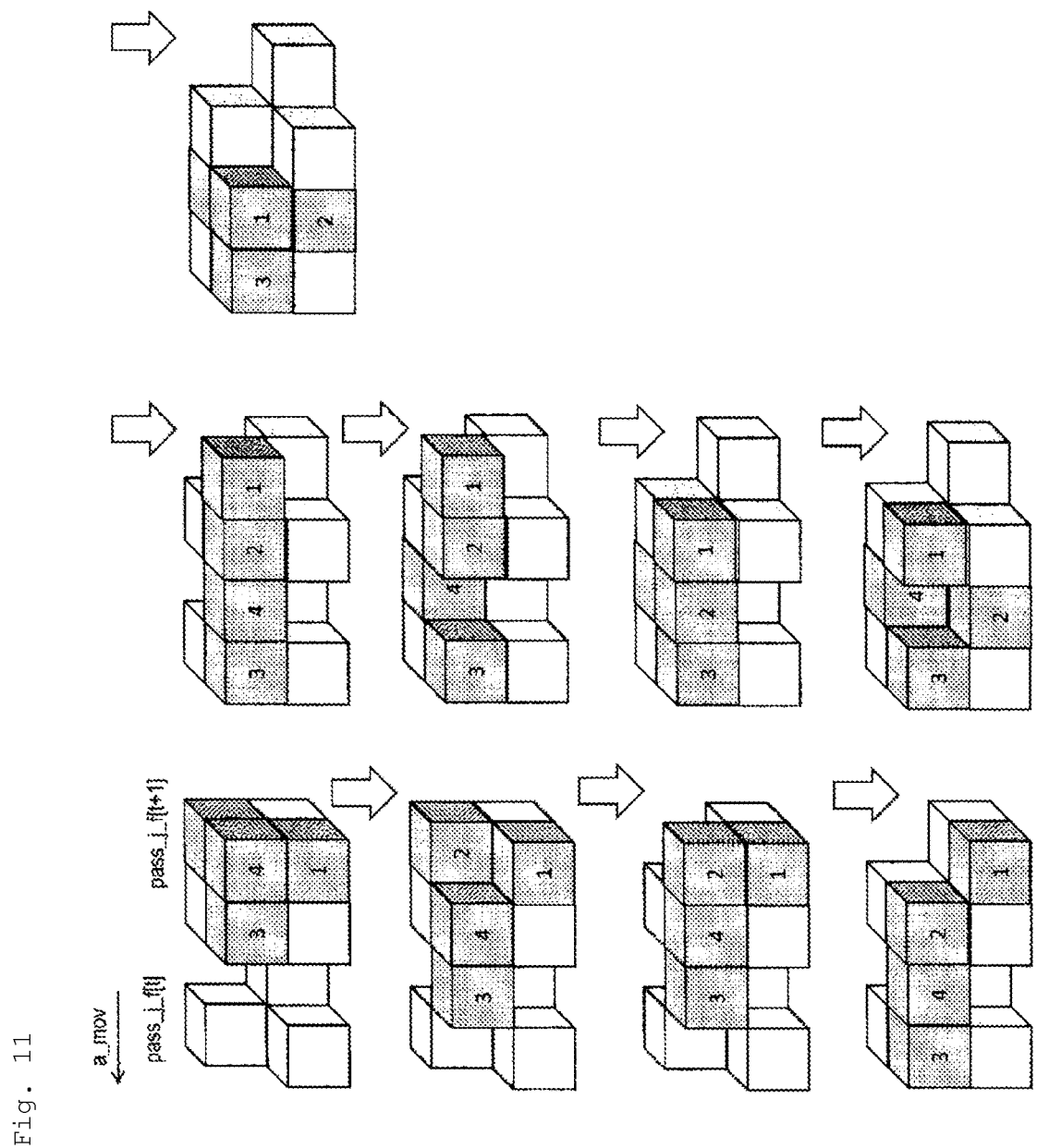
FIG. 11 is a diagram illustrating movements of control object units.
Figure 12:
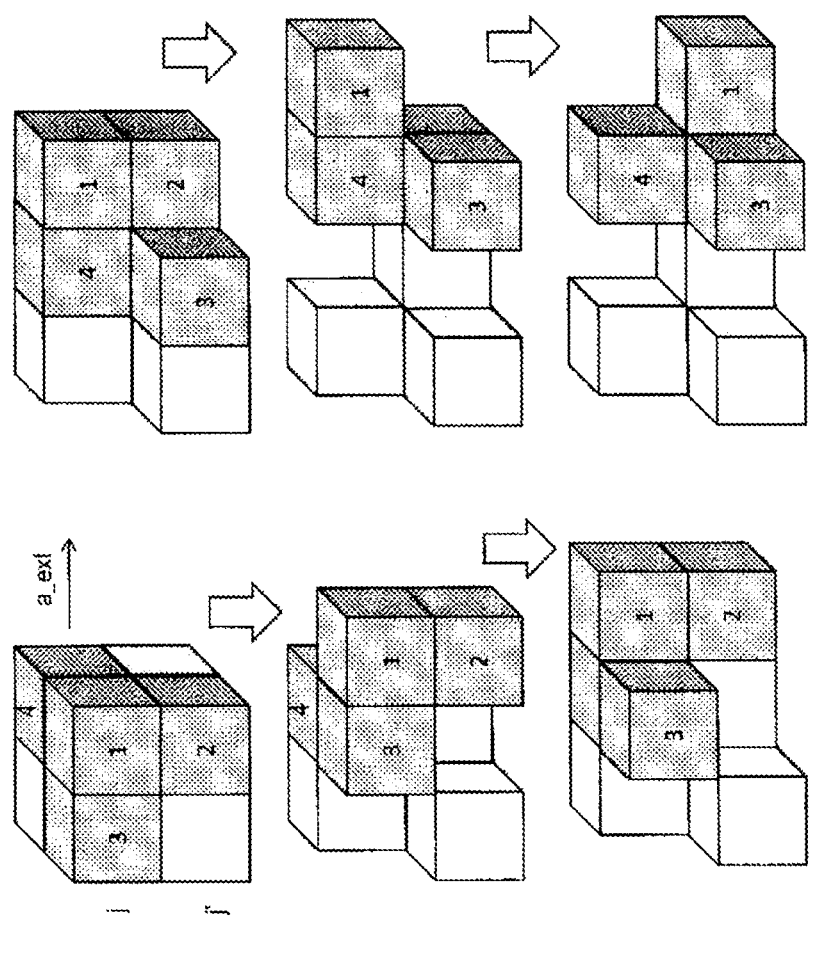
FIG. 12 is a diagram illustrating movements of control object units.
Figure 13:
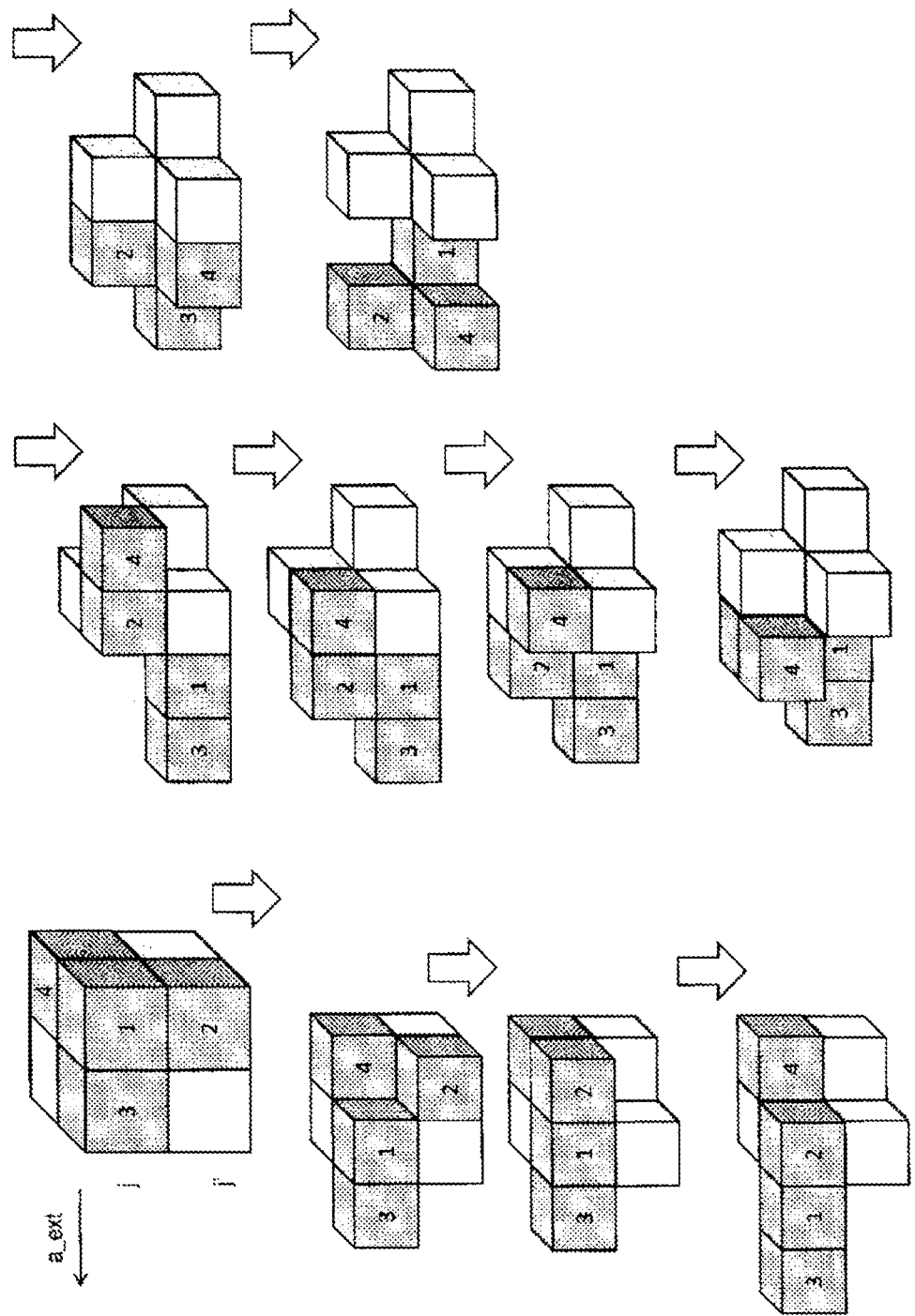
FIG. 13 is a diagram illustrating movements of control object units.
Figure 14:
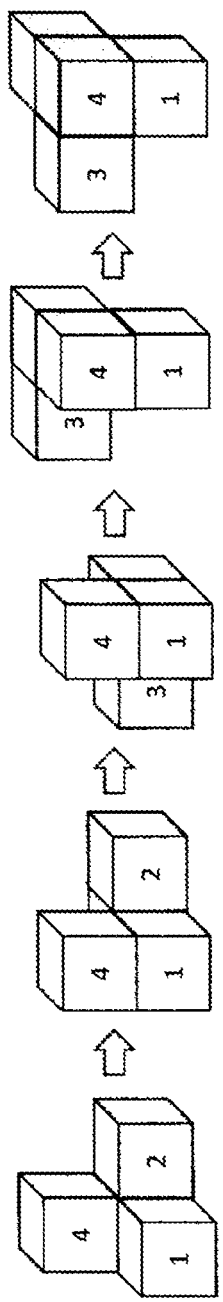
FIG. 14 is a diagram illustrating movements of control object units.

FIG. 6 shows one step of a tunneling operation of an 8-cell control object unit using two 4-cell control object units to be used in the present invention. Details of a motion of a control object unit denoted by "0" in motion 1 shown in FIG. 6 are as shown in FIG. 12 or 13. Details of a motion of a control object unit 1 in motion 2 shown in FIG. 6 are as shown in FIG. 10. Details of a motion of a control object unit denoted by "0" in motion 3 shown in FIG. 6 are as shown in FIG. 14. Details of a motion of a control object unit denoted by "0" in motion 4 shown in FIG. 6 are as shown in FIG. 11. Details of a motion of a control object unit denoted by "1" in motion 5 shown in FIG. 6 are as shown in FIG. 14. Due to the series of motions shown in FIG. 6, the 8-cell control object unit denoted by "1" extends and the 8-cell control object unit denoted by "0" which is a head control object unit advances its position by 1. It should be noted that, in this description, a situation where a size of a space occupied by a control object unit with a same ID (in this case, an "ID" refers to numerals such as "0" and "1" in FIG. 6) increases is expressed as "a control object unit extends".

Figure 7:
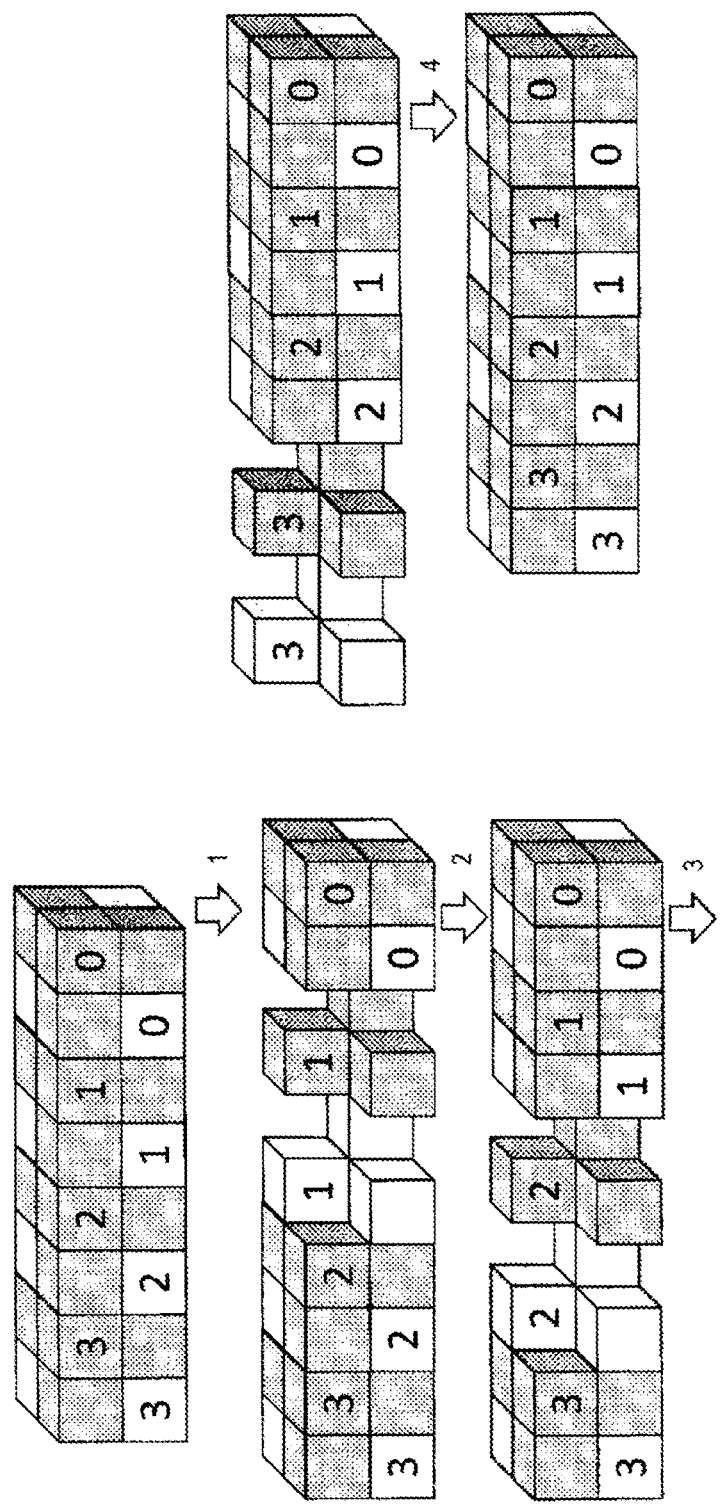
FIG. 7 is a diagram illustrating tunneling.
Figure 8:
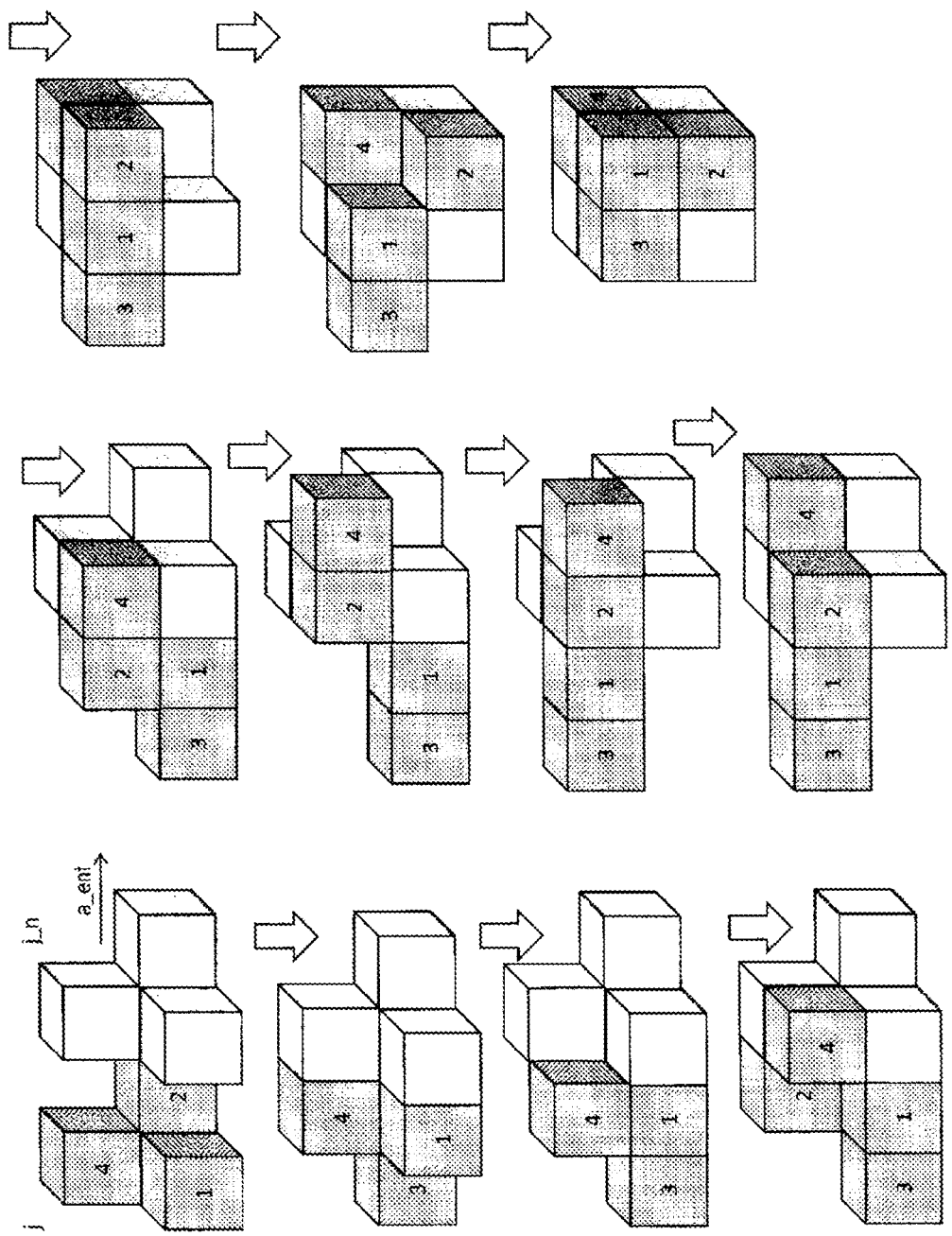
FIG. 8 is a diagram illustrating movements of control object units.
Figure 9:
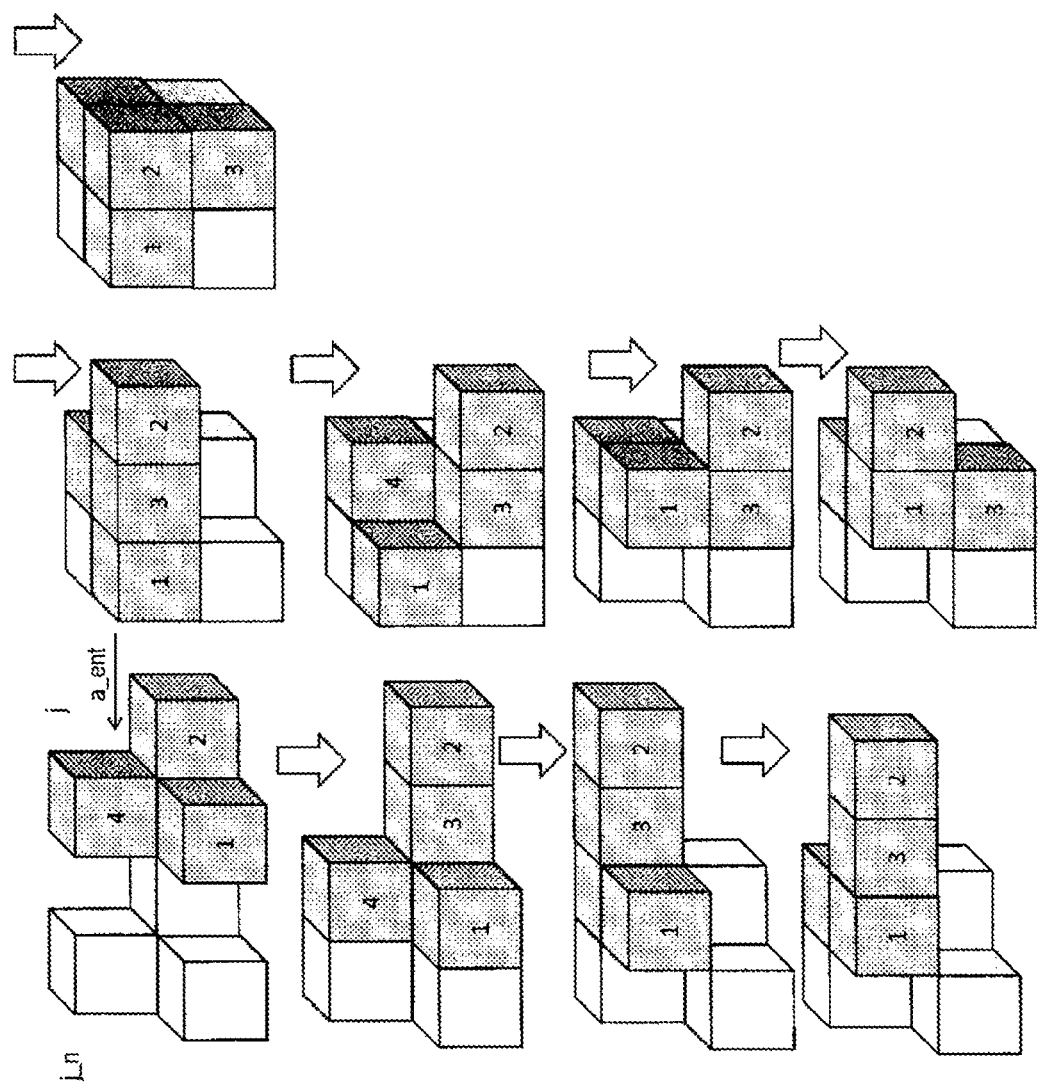
FIG. 9 is a diagram illustrating movements of control object units.

A situation where the motions of FIG. 6 are repeated is shown in FIG. 7. Due to motion 2 shown in FIG. 7, the extended 8-cell control object unit denoted by "1" contracts, the 8-cell control object unit denoted by "2" extends, and the 8-cell control object unit denoted by "1" advances its position by 1. Due to motion 3 shown in FIG. 7, the extended 8-cell control object unit denoted by "2" contracts, the 8-cell control object unit denoted by "3" which is a tail control object unit extends, and the 8-cell control object unit denoted by "2" advances its position by 1. Due to motion 4 shown in FIG. 7, the extended 8-cell control object unit denoted by "3" contracts and the 8-cell control object unit denoted by "3" advances its position by 1. Accordingly, in a final motion shown in FIG. 7, a motion of the control object unit denoted by "3" which is the tail control object unit Tail is completed. Details of a motion of a tail control object unit in the final motion shown in FIG. 7 are as shown in FIG. 8 or 9.

With conventional methods, no particular restrictions apply to the selection of the head control object unit Head other than that the head control object unit Head is at a position of a control object unit adjacent to a non-filled location in the target position G. On the other hand, although the selection of the tail control object unit Tail requires some kind of measure in order to maintain connectivity of a control object structure when removing the tail control object unit Tail from control objects in the initial position S, this problem is also solved by conventional methods if the initial position S and the target position G have one common portion. In this case, expression (1) below is useful as a condition that determines whether or not a control object structure can maintain connectivity when a control object unit j in the initial position S is removed from the control object structure.

$$\delta(j) > \delta(j\_n) \quad (1)$$

In expression (1), $\delta(j)$ denotes a Manhattan distance of the control object unit j from the head control object unit Head inside the control object structure. In addition, j_n denotes the number of a control object unit adjacent to the control object unit j. When expression (1) is true with respect to all control object units j_n, the connectivity of the control object structure can be maintained even if the control object unit j is removed from the control object structure. In other words, a control object unit satisfying expression (1) may be selected as the tail control object unit Tail. Simply stated, no problems arise as long as a control object unit that maximizes $\delta$ is always selected as the tail control object unit Tail.

Next, a method of selecting the head control object unit Head and the tail control object unit Tail in the present invention will be described. It is assumed that a common portion of an initial position and a target position is divided into Ncommon-number of portions, and each portion is expressed as a common position subset C[1], C[2], C[3], . . . , C[Ncommon]. In other words, assuming that a set of common positions is constituted by at least one common position subset that is not mutually adjacent, the at least one common position subset is expressed as C[1], C[2], C[3], . . . , C[Ncommon].

First, when selecting the head control object unit Head, care must be exercised so that none of the Ncommon-number of common position subsets become disconnected from an entire control object structure during a transformation operation. For example, when control objects in the initial position S are gradually moved into the target position G, the number of control objects remaining in the initial position S decreases accordingly. If care is not exercised in this process, a situation where there is no control object that can be used to connect the common portion to both a control object in the initial position S and a control object in the target position G may occur. In addition, even when the head control object unit Head is selected from the target position G and the tail control object unit Tail is selected from the initial position S, the common portion of the initial position S and the target position G may function as both the initial position S and the target position G. For this reason, unless appropriate control is exercised in the process, there is a risk that an endless selection loop of the head control object unit Head and the tail control object unit Tail is created. In order to avoid such situations, new rules (1) to (4) below are provided.

(1) A set of positions of control object units filled by tunneling with an object position D of the head control object unit Head as an object position during a transformation operation is denoted as Up. In addition, only control object units at a position belonging to the set Up are made selectable as the head control object unit Head at an arbitrary time point. It should be noted that a process corresponding to the rule (1) is performed in step S2 of a control object unit selecting unit 2 to be described later.

(2) Only control object units at a position belonging to S-Up are made selectable as the tail control object unit Tail at an arbitrary time point. It should be noted that a process corresponding to the rule (2) is performed in step S2 of the control object unit selecting unit 2 to be described later.

(3) At a start time point of a transformation operation, positions of all control object units belonging to any one C[i_start] among C[1], C[2], C[3], . . . , C[Ncommon] are added to set Up. It should be noted that a process corresponding to the rule (3) is performed in step S1 of the set selecting unit 1 to be described later.

(4) When the set Up comes into contact with any of the control object units in C[i_connected] during a transformation operation, all of the positions of the control object units in C[i_connected] in a connected state from the set Up in the set G of the target positions are added to set Up. C[i_connected] denotes a common position subset that newly comes into contact with a control object unit in Up during a transformation operation. For example, in FIG. 15(G) to be described later, C(2) is C[i_connected]. It should be noted that a process corresponding to the rule (4) is performed in step S4 of the set adding unit 4 to be described later.

The rules (1) and (2) are for performing control during tunneling as though only the set Up is a sole connecting portion of the target position G and the initial position S and, accordingly, creating a state where expression (1) is applicable during a transformation operation. The rule (3) is for securing options for the head control object unit Head at the start of an array transformation operation. The rule (4) is for adding, when C[i_start] and another common position subset are connected via the target position G and can now be handled as one connected portion, the connected common position subset to the set Up as an option for the head control object unit Head.

According to the rules (1) to (4), array control that is applicable even when there is a disconnect location in a common portion of initial positions of control object units and target positions of the control object units can be realized.

By repetitively performing the tunneling operation described above until all control object units j in the initial position S reach the target position G, homogeneous array control is completed.

EMBODIMENT

Hereinafter, an embodiment of the control apparatus and the control method will be described.

Figure 16:
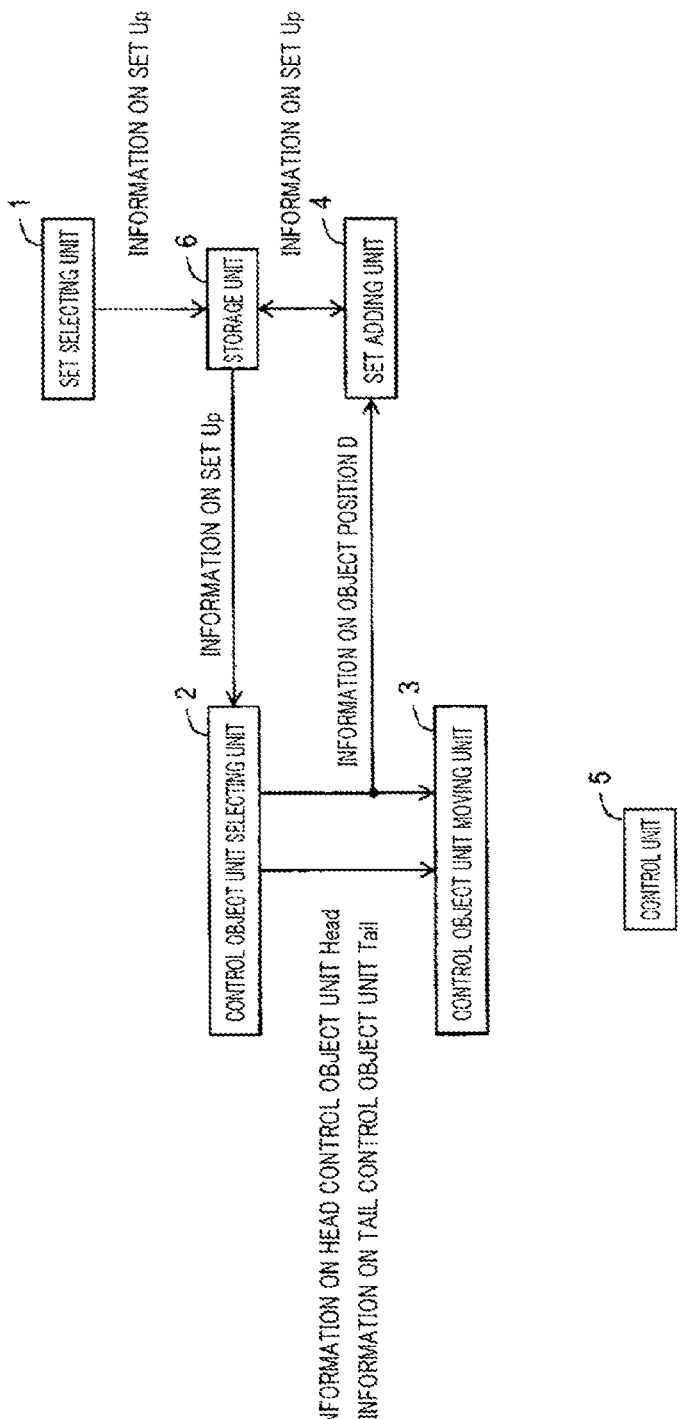
FIG. 16 is a block diagram illustrating an example of a control apparatus.

As shown in FIG. 16, for example, the control apparatus includes the set selecting unit 1, the control object unit selecting unit 2, a control object unit moving unit 3, the set adding unit 4, a control unit 5, and a storage unit 6.

Figure 17:
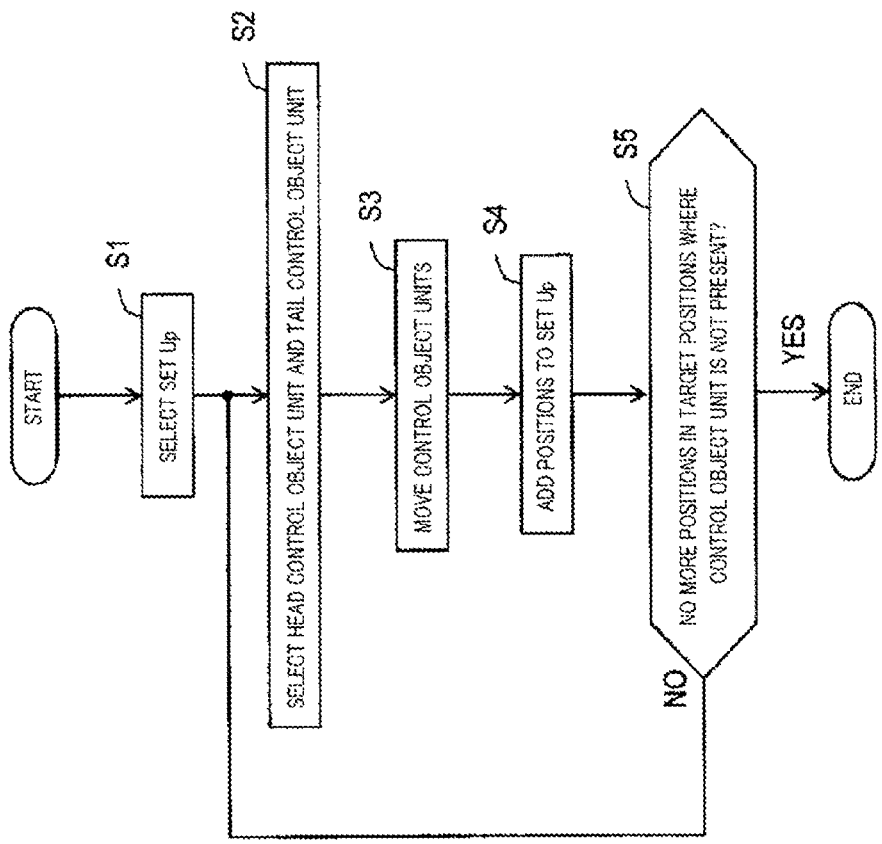
FIG. 17 is a flow chart illustrating an example of a control method.

The control method is realized as the respective units of the control apparatus perform processes of steps S1 to S5 shown in FIG. 17 and described below.

[Set Selecting Unit 1]

Information on the common position subsets C[1], C[2], C[3], . . . , C[Ncommon] is input to the set selecting unit 1.

The set selecting unit 1 selects any one common position subset as the set Up (step S1). Information on the set Up is stored in the storage unit 6. As the set Up, any of the common position subsets C[1], C[2], C[3], . . . , C[Ncommon] may be selected.

Specifically, the set selecting unit 1 adopts any one value from 1 to Ncommon as i_start and selects all positions belonging to a common position subset C[i_start] as the set Up.

[Control Object Unit Selecting Unit 2]

The control object unit selecting unit 2 reads information on the set Up from the storage unit 6.

The control object unit selecting unit 2 selects a control object unit which is at a position belonging to the set Up and which is adjacent to a position where a control object unit in the target positions is not present (hereinafter, referred to as an object position D) as a head control object unit and which selects a control object unit which is at a position not belonging to the set Up and being in the initial positions and which is capable of maintaining connectivity of the control object structure even when moved as a tail control object unit (step S2).

In this case, formation of one block of control object structure by control object units due to each control object unit being adjacent to another control object unit will be referred to as connectivity of a control object structure.

Information on the selected head control object unit and the tail control object unit is output to the control object unit moving unit 3. In addition, information on the object position D is output to the control object unit moving unit 3 and the set adding unit 4.

Specifically, the control object unit selecting unit 2 selects anyone control object unit which is at a position belonging to the set Up and which is in contact with a non-filled position in the target position G and adopts the selected control object unit as the head control object unit Head. In addition, the control object unit selecting unit 2 adopts a non-filled position of a control object unit in the target position G that is adjacent to the head control object unit Head as the object position D. Furthermore, the control object unit selecting unit 2 selects an arbitrary control object unit which is at a position being in the initial position S and not belonging to the set Up and which satisfies expression (1) and adopts the selected control object unit as the tail control object unit Tail.

[Control Object Unit Moving Unit 3]

Information on the head control object unit and the tail control object unit and information on the object position D are input to the control object unit moving unit 3.

With the object position D as an object position, the control object unit moving unit 3 moves a string of control object units from the head control object unit to the tail control object unit so that the string of control object units follows a motion of the head control object unit (step S3).

Specifically, with the object position D as an object position, the control object unit moving unit 3 executes, for example, tunneling such as that shown in FIG. 7 with respect to the string of control object units from the head control object unit to the tail control object unit.

In doing so, when one control object unit is made of a combination of two control object units, the control object unit moving unit 3 moves the one control object unit by alternately moving each of the two control object units that constitute the one control object unit by a distance corresponding to the size of the one control object unit.

[Set Adding Unit 4]

Information on the object position D is input to the set adding unit 4. In addition, the set adding unit 4 reads information on the set Up from the storage unit 6.

After adding the object position D to the set Up, when there is a control object unit which is in contact with the set Up and which is positioned not in the set Up but in the target positions, the set adding unit 4 adds a position of the control object unit and a position of a control object unit that is in a connected state from the control object unit only via the target positions (including a common position) to the set Up (step S4). Information on the set Up is stored in the storage unit 6.

Specifically, after adding the object position D to the set Up, when there is a control object unit j which is in contact with the set Up, which is not included in the set Up, but which is in the target position G, the set adding unit 4 adds a position of the control object unit j and positions of all control object units that are in a connected state from the control object unit j only via the target position G (including a common position) to the set Up.

[Control Unit 5]

The control unit 5 causes processes of the control object unit selecting unit 2, the control object unit moving unit 3, and the set adding unit 4 to be repetitively performed until no position remains where a control object is not present in the target positions (step S5).

Specifically, the control unit 5 determines whether or not a non-filled position remains in the target position G and, if so, returns to step S2. If not, the control unit 5 ends processes of the control apparatus and the control method.

Such a configuration enables homogeneous array control to be performed while taking the presence of a large number of control object units into consideration from a array-formed state at an arbitrary initial position to an array-formed state at another arbitrary target position while maintaining a state where the control object units are in contact with each other even when there is a disconnect in a common portion of a set of initial positions and a set of target positions and even in an environment with an obstacle. In addition, array control can also be performed in a case where there is a disconnect location in a portion created by removing the common position from the set of target positions.

Specific Example

Figure 15:
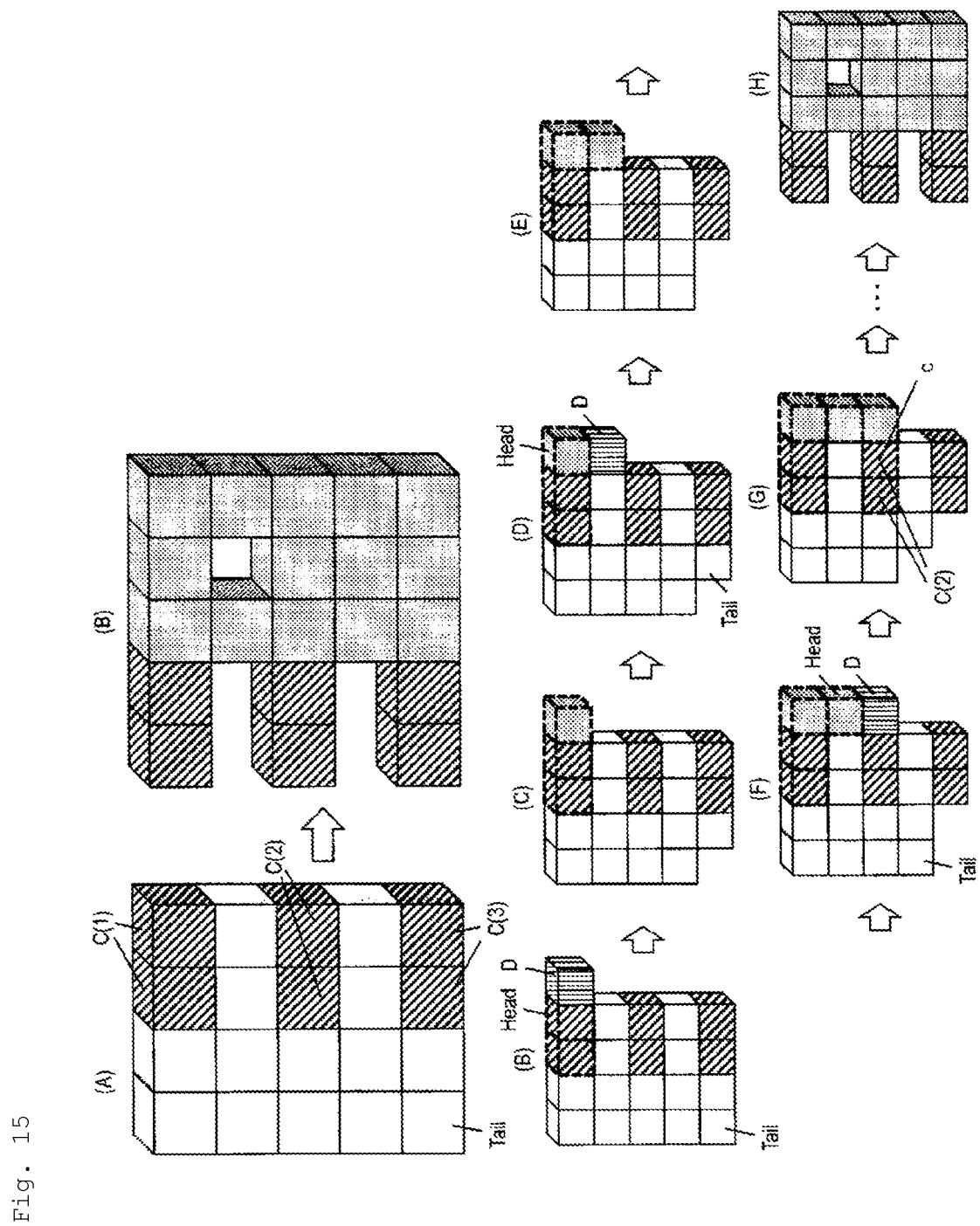
FIG. 15 is a diagram illustrating a specific example of a control process.

A specific example of a control process according to the control apparatus and the control method will be described with reference to FIG. 15.

FIG. 15(A) represents initial positions of control object units, and FIG. 15(B) represents target positions of the control object units. In FIGS. 15(A) and 15(B), white cubes and hatched cubes represent initial positions of control object units and dotted cubes and hatched cubes represent target positions of the control object units. The hatched cubes represent common positions which are a common portion of the initial positions and the target positions of the control object unit.

In FIG. 15(A), a set of common positions is constituted by three common position subsets C(1), C(2), and C(3) which are not adjacent to each other. In FIG. 15(A), a position of two uppermost hatched cubes is denoted by C(1), a position of two center hatched cubes is denoted by C(2), and a position of two lowermost hatched cubes is denoted by C(3).

For example, as shown in FIG. 15(B), the set selecting unit 1 selects the common position subset C(1) as the set Up (step S1). In FIGS. 15(B) to 15(G), positions belonging to the set Up are represented by bold dotted lines.

For example, as shown in FIG. 15(B), the control object unit selecting unit 2 selects the head control object unit Head, the tail control object unit Tail, and the object position D (step S2).

With the object position D shown in FIG. 15(B) as an object position, the control object unit moving unit 3 moves a string of control object units from the head control object unit Head to the tail control object unit Tail (step S3). As a result, the control object units assume positions shown in FIG. 15(C).

The set adding unit 4 adds the object position D shown in FIG. 15(B) to the set Up (step S4). In this case, since there is no control object unit which is in contact with the set Up and which is positioned not in the set Up but in the target positions, positions other than the object position D are not added to the set Up. As a result, the positions belonging to the set Up are as shown in FIG. 15(C).

Since there remains a position in the target positions where a control object is not present, a return is made to the process of step S2 (step S5).

For example, as shown in FIG. 15(D), the control object unit selecting unit 2 selects the head control object unit Head, the tail control object unit Tail, and the object position D (step S2).

With the object position D shown in FIG. 15(D) as an object position, the control object unit moving unit 3 moves a string of control object units from the head control object unit Head to the tail control object unit Tail (step S3). As a result, the control object units assume positions shown in FIG. 15(E).

The set adding unit 4 adds the object position D shown in FIG. 15(D) to the set Up (step S4). In this case, since there is no control object unit which is in contact with the set Up and which is positioned not in the set Up but in the target positions, positions other than the object position D are not added to the set Up. As a result, the positions belonging to the set Up are as shown in FIG. 15(E).

Since there remains a position in the target positions where a control object is not present, a return is made to the process of step S2 (step S5).

For example, as shown in FIG. 15(F), the control object unit selecting unit 2 selects the head control object unit Head, the tail control object unit Tail, and the object position D (step S2).

With the object position D shown in FIG. 15(F) as an object position, the control object unit moving unit 3 moves a string of control object units from the head control object unit Head to the tail control object unit Tail (step S3). As a result, the control object units assume positions shown in FIG. 15(G).

The set adding unit 4 adds the object position D shown in FIG. 15(F) to the set Up (step S4). In this case, there is a control object unit which is in contact with the set Up and which is positioned not in the set Up but in the target positions (the control object unit at the position denoted by c in FIG. 15(G)). Therefore, in this case, the set adding unit 4 adds the position c and positions of control object units in a connected state from the control object unit at the position c only via the target positions (including a common position) (in other words, positions belonging to the common position subset C(2) with the exception of the position c) to the set Up. As a result, the positions belonging to the set Up are as shown in FIG. 15(G). It should be noted that, in this case, C[2] becomes C[i_connected]. Due to the process of step S4, C[2] that is C[i_connected] is added to the set Up.

By repeating such processes, eventually, the control object units can be moved to the target position as shown in FIG. 15(H).

<Modification>

It should be noted that the movement of the string of control object units from the head control object unit Head to the tail control object unit Tail (hereinafter, referred to as a tunneling operation) may be performed in parallel. For example, by starting a tunneling operation on the basis of a next head control object unit Head, a next tail control object unit Tail, and a next object position D after a prescribed number of time steps after starting a tunneling operation on the basis of a certain head control object unit Head, a certain tail control object unit Tail, and a certain object position D, parallel processing of the tunneling operations can be performed. In doing so, control object units that move in the subsequent tunneling operation is prevented from overtaking control object units that move in the preceding tunneling operation. In other words, when a route connecting the head control object unit Head and the tail control object unit Tail in the subsequent tunneling operation overlaps with a route connecting the head control object unit Head and the tail control object unit Tail in the preceding tunneling operation, the subsequent tunneling operation is placed on standby in the overlapping section so that the control object units of the preceding tunneling operation pass first.

While a so-called 8-cell sliding cube is used as a control object unit in the embodiment described above, control object units such as an 8-cell compressing type and a 4-cell sliding cube may be used as long as tunneling operations can be performed. In addition, robots other than so-called shear robots and extension/contraction robots may be used as a control object unit as long as tunneling operations can be performed.

<Program and Recording Medium>

When realizing the process of each unit of the control apparatus with a computer, processing contents of a function which each unit of the apparatus must be equipped with are described by a program. In addition, the process of each unit is realized on the computer by having the computer execute the program.

The program describing the processing contents can be recorded in a computer-readable recording medium. Any computer-readable recording medium may be used such as a magnetic recording apparatus, an optical disk, a magneto-optical recording medium, and a semiconductor memory.

In addition, the process of each unit may be configured by having a computer execute a prescribed program, or at least a part of the processes may be realized by hardware.

Furthermore, it is needless to say that the present invention can be appropriately modified without departing from the scope and spirit of the invention.

The invention claimed is:

1. A computer-implemented method for moving a plurality of control objects in a three-dimensional space, the method comprising:

selecting a set of common positions, the set of common positions including one or more overlapping portions of a set of initial positions and a set of target positions of moving the plurality of control objects, wherein the set of initial positions represents a set of positions initially occupied by the plurality of control objects, wherein the set of target positions represents a set of positions to be occupied by the plurality of control objects as a destination, wherein the set of common positions include a first subset of common positions and a second subset of common positions, wherein the first subset of common positions is non-adjacent to the second subset of common positions, wherein the plurality of control objects include a control object being capable of moving while causing at least a contact surface of the control object and a contact surface of an adjacent control object to slide against each other, and wherein the control object slides while maintaining the adjacent control object being present in one of six adjacent cells in vertical, lateral, or height directions in a periphery of the control object in sliding movement;

initializing a set of selected positions according to the first subset of common positions;

selecting a head object of the plurality of control objects, wherein the head object corresponds to a first control object of the plurality of control objects located within the set of selected positions and is adjacent to a position not occupied by the plurality of control objects inside the set of target positions;

selecting a tail object of the plurality of control objects, wherein the tail object corresponds to a second control object of the plurality of control objects at a position simultaneously being outside the first subset of common positions and inside the set of selected positions, and is movable while maintaining each control object connecting to another control object in a control object structure;

moving, in series from the head object to the tail object, each of the plurality of control objects, wherein control objects that are subsequent to the head object repeat a set of sliding movements made by one or more portions of the head object, wherein the head object moves to the position not occupied by the plurality of control objects inside the set of target positions, and wherein the moving causes at least a contact surface of each control object to slide against another control object;

based on the moved control objects, first updating the set of selected positions by adding the position not occupied by the plurality of control objects in the set of target positions;

second updating the set of selected positions by adding the second subset of common positions, when one or more positions of the second subset of common position are adjacent to portions of positions occupied by the moved control objects; and repeating a sequence of processing including at least the selecting of the head object, the selecting of the tail object, the moving each of the plurality of control objects in series, the first updating and the second updating of the set of selected positions, until at least a part of the plurality of control objects occupies all portions of the set of target positions.

2. The computer-implemented method of claim 1, wherein the maintaining each control object includes a formation of the control object structure based on positioning each control object being adjacent to another control object.

3. The computer-implemented method of claim 1, wherein the set of common positions includes at least portions of positions that are not adjacent to each other.

4. The computer-implemented method of claim 1, the method further comprising:

determine a sequence of moving one or more portions of the head object based on a current position of the head object and the set of target positions.

5. The computer-implemented method of claim 1, the method further comprising:

moving the plurality of control objects concurrently based on the set of movements made by one or more portions of the head object.

6. The computer-implemented method of claim 1, wherein the three-dimensional space comprises one or more positions, and wherein each of the one or more positions comprises a plurality of cubicle spaces of an equal size connected to one another.

7. The computer-implemented method of claim 6, wherein each of the plurality of control objects comprises four distinct cubes of the equal size, wherein a first cube being adjacent to a second cube on a first surface of the first cube, wherein the first cube being adjacent to a third cube on a second surface of the first cube, wherein the first cube being adjacent to a fourth cube on a third surface of the first cube, and wherein the first surface, the second surface, and the third surface are distinct.

8. A system for moving a plurality of control objects in a three-dimensional space, the system comprising:

a processor; and a memory storing computer-executable instructions that when executed by the processor cause the system to:

select a set of common positions, the set of common positions including one or more overlapping portions of a set of initial positions and a set of target positions of moving the plurality of control objects, wherein the set of initial positions represents a set of positions initially occupied by the plurality of control objects, wherein the set of target positions represents a set of positions to be occupied by the plurality of control objects as a destination, wherein the set of common positions include a first subset of common positions and a second subset of common positions, wherein the first subset of common positions is non-adjacent to the second subset of common positions, wherein the plurality of control objects include a control object being capable of moving while causing at least a contact surface of the control object and a contact surface of an adjacent control object to slide against each other, and wherein the control object slides against the adjacent control object while maintaining the adjacent control object being present in one of six adjacent cells in vertical, lateral, or height direction in a periphery of the control object in sliding movement;

initializing a set of selected positions according to the first subset of common positions;

select a head object of the plurality of control objects, wherein the head object corresponds to a first control object of the plurality of control objects located within the set of current positions and is adjacent to a position not occupied by the plurality of control objects inside the set of target positions;

select a tail object of the plurality of control objects, wherein the tail object corresponds to a second control object of the plurality of control objects at a position simultaneously being outside the first subset of common positions and inside the set of selected positions, and is movable while maintaining each control object connecting to another control object in a control object structure;

move, in series from the head object to the tail object, each of the plurality of control objects wherein control objects subsequent to the head object repeat a set of movements made by one or more portions of the head object, wherein the head object moves to the position not occupied by the plurality of control objects inside the set of target positions, and wherein the moving causes at least a contact surface of each control object to slide against another control object;

based on the moved control objects, first update the set of selected positions by adding the position not occupied by the plurality of control objects in the set of target positions;

second update the set of selected positions by adding the second subset of common positions, when one or more positions of the second subset of common position are adjacent to portions of positions occupied by the moved control objects; and repeat a sequence of processing including at least the selecting of the head object, the selecting of the tail object, the moving of each of the plurality of control objects in series, the first updating and the second updating of the set of selected positions, until at least a part of the plurality of control objects occupies all portions of the set of target positions.

9. The system of claim 8, wherein the maintaining each control object includes a formation of the control object structure by control object based on positioning each control object being adjacent to another control object.

10. The system of claim 8, wherein the set of common positions includes at least portions of positions that are not adjacent to each other.

11. The system of claim 8, the computer-executable instructions when executed further causing the system to:
determine a sequence of moving one or more portions of the head object based on a current position of the head object and the set of target positions.

12. The system of claim 8, the computer-executable instructions when executed further causing the system to:
move a plurality of portions of the plurality of control objects concurrently based on the set of movements made by one or more portions of the head object.

13. The system of claim 8, wherein the three-dimensional space comprises one or more positions, and wherein each of the one or more positions comprises a plurality of cubicle spaces of an equal size connected to one another.

14. The system of claim 13, wherein each of the plurality of control objects comprises four distinct cubes of the equal size,
wherein a first cube being adjacent to a second cube on a first surface of the first cube,
wherein the first cube being adjacent to a third cube on a second surface of the first cube,
wherein the first cube being adjacent to a fourth cube on a third surface of the first cube, and
wherein the first surface, the second surface, and the third surface are distinct.

15. A computer-readable non-transitory recording medium storing computer-executable instructions that when executed by a processor cause a computer system to:
select a set of common positions, the set of common positions including one or more overlapping portions of a set of initial positions and a set of target positions of moving a plurality of control objects in a three-dimensional space, wherein the set of initial positions represents a set of positions initially occupied by the plurality of control objects, wherein the set of target positions represents a set of positions to be occupied by the plurality of control objects as a destination, wherein the set of common positions include a first subset of common positions and a second subset of common positions, wherein the first subset of common positions is non-adjacent to the second subset of common positions, wherein the plurality of control objects include a control object being capable of moving while causing at least a contact surface of the control object and a contact surface of an adjacent control object being present in one of six adjacent cells in vertical, lateral, or height directions in a periphery of the control object in sliding movement;

initializing a set of selected positions according to the first subset of common positions;

select a head object of the plurality of control objects, wherein the head object corresponds to a first control object of the plurality of control objects located within the set of selected positions and is adjacent to a position not occupied by the plurality of control objects inside the set of target positions;

select a tail object of the plurality of control objects, wherein the tail object corresponds to a second control object of the plurality of control objects at a position simultaneously being outside the first subset of common positions and inside the set of selected positions, and is movable while maintaining each control object connecting to another control object in a control object structure;

move, in series from the head object to the tail object, each of the plurality of control objects wherein control objects subsequent to the head object repeat a set of sliding movements made by one or more portions of the head object, wherein the head object moves to the position not occupied by the plurality of control objects inside the set of target positions, and wherein the move causes at least a contact surface of each control object to slide against another control object;

based on the moved control objects, first update the set of selected positions by adding based on the position not occupied by the plurality of control objects in the set of target position;

second update the set of selected positions by adding the second subset of common positions, when one or more positions of the second subset of common position are adjacent to portions of positions occupied by the moved control objects; and repeat a sequence of processing including at least the selecting of the head object, the selecting of the tail object, the moving of each of the plurality of control objects in series, the first updating and the second updating of the set of selected positions, until at least a part of the plurality of control objects occupies all portions of the set of target positions.

16. The computer-readable non-transitory recording medium of claim 15, wherein the maintaining each control object includes a formation of the control object structure based on positioning each control object being adjacent to another control object, and wherein the set of common positions includes at least portions of positions that are not adjacent to each other.

17. The computer-readable non-transitory recording medium of claim 15, the computer-executable instructions when executed further causing the system to:
determine a sequence of moving one or more portions of the head object based on a current position of the head object and the set of target positions.

18. The computer-readable non-transitory recording medium of claim 15, the computer-executable instructions when executed further causing the system to:
move a plurality of portions of the plurality of control objects concurrently based on the set of movements made by one or more portions of the head object.

19. The computer-readable non-transitory recording medium of claim 15, wherein the three-dimensional space comprises one or more positions, and wherein each of the one or more positions comprises a plurality of cubicle spaces of an equal size connected to one another.

20. The computer-readable non-transitory recording medium of claim 19, wherein each of the plurality of control objects comprises four distinct cubes of the equal size,
  wherein a first cube being adjacent to a second cube on a first surface of the first cube,
  wherein the first cube being adjacent to a third cube on a second surface of the first cube,
  wherein the first cube being adjacent to a fourth cube on a third surface of the first cube, and
  wherein the first surface, the second surface, and the third surface are distinct.

* * * * *